Sept. 5, 1950 — R. N. KIRCHER — 2,521,463

HANDLE ASSEMBLY FOR UTENSILS

Filed March 14, 1946

INVENTOR.
Ralph N. Kircher
BY John W. Michael
ATTORNEY

Patented Sept. 5, 1950

2,521,463

UNITED STATES PATENT OFFICE 2,521,463

HANDLE ASSEMBLY FOR UTENSILS

Ralph N. Kircher, West Bend, Wis., assignor to West Bend Aluminum Co., West Bend, Wis., a corporation of Wisconsin Application March 14, 1946, Serial No. 654,448

2 Claims. (Cl. 16—110)

This invention relates to improvements in handle sockets for utensils and to the method of connecting them to the utensils.

The conventional method of combining the non-metallic handle and an aluminum utensil comprises riveting an aluminum die-cast socket to the container. Such construction is undesirable because the rivets mar the smooth surface of the interior of the container, spoil the appearance of the utensil, and make it harder to clean.

One of the objects of this invention, therefore, is to provide a method by which a handle socket can be attached to a sheet aluminum container without marring the smooth surface of its interior.

Another object of the invention is to provide a handle socket for a utensil which is neat in appearance, strong, and economical to manufacture and assemble to the container.

These objects are accomplished by first making a handle socket which is cold-pressed from slugs of sheet aluminum. It has a securing flange shaped to the outer form of the container and is provided with a non-circular projection which may engage a spacer or neck. The socket so made is then spot-welded to the sheet aluminum container. As there is no difficulty in spot-welding sheet aluminum to sheet aluminum there will be no marring of the interior of the utensil and a good but inexpensive handle socket is obtained.

The novel features, which are considered characteristic of the invention, are set forth with particularity in the appended claims. The invention itself, however, both as to its organization and its method of operation, together with additional objects and advantages thereof, will best be understood from the following description of a specific embodiment when read in connection with the accompanying drawing, in which:

Figure 1:
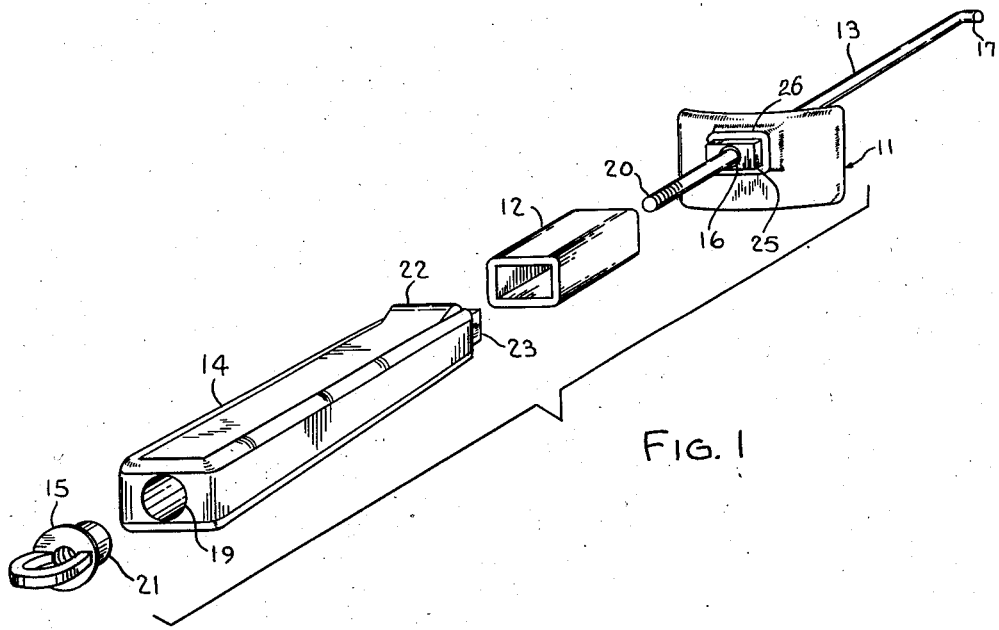
Figure 1 is an exploded view in perspective of the socket and non-metallic handle embodying the present invention.
Figure 2:
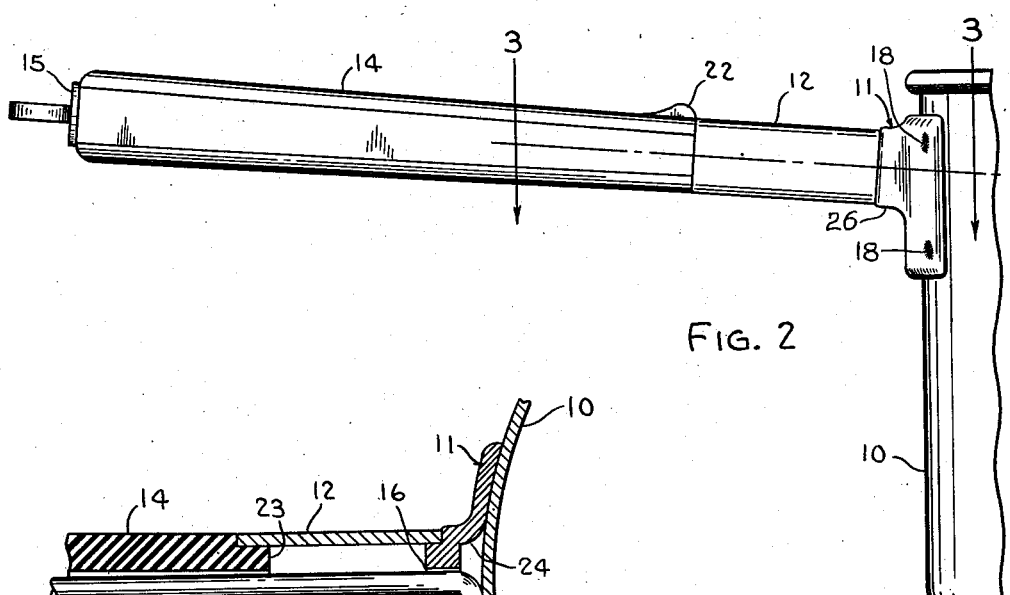
Figure 2 is a fragmentary view in side elevation of the socket and handle assembled in position on a container.
Figure 3:
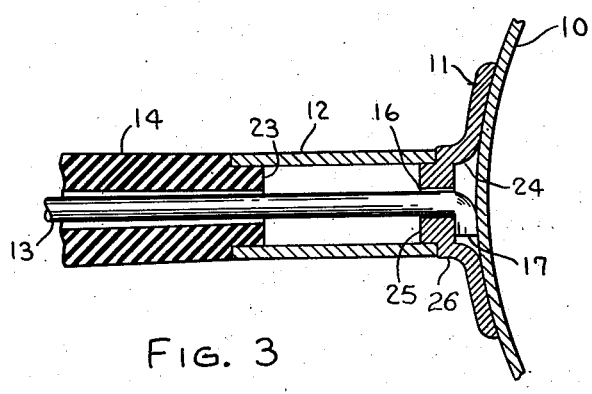
Figure 3 is a fragmentary cross-sectional view taken on the line 3—3 of Figure 2.

Referring to the drawings by reference numerals, the socket 11 is shown attached to an aluminum container 10. Such vessel is pressed from sheet aluminum consisting of such alloys as permit it to properly fuse in the spot welding process. A spacer or neck 12 and a handle 14 may be secured to the socket 11 by a handle-holding rod 13 and held by a handle-holding nut 15 threadedly interconnected with the rod 13.

The socket 11 is first coined or cold-pressed in one operation from a slug of aluminum alloy of ¼ inch thickness, or even greater, depending upon the desired size of the boss 26 and projection 25. Extreme pressure is used, and the socket 11 is provided with a flange shaped to conform with the shape of the container to which it is to be attached. At the same time the socket 11 is provided with a boss 26 and a recess 24. The recess 24, when used, is formed on the container-confronting face and is of sufficient size to receive within its confines the head or bent-over end 17 of the handle-holding member 13 and prevent rotation of said member. The outer face of the boss 26 is provided with a rectangular or other non-circular shaped projection 25 which is adapted to engage and mate with the neck 12 to prevent relative rotation therebetween. An aperture 16 is pierced or drilled through the boss 26 and projection 15 to receive the rod 13. The alloy composition of the slug of sheet aluminum from which the socket is formed is such as to permit it to properly fuse in the spot welding process.

In one embodiment, the rod 13 is headed at its inner end. This head may take the form of a lateral projection 17 which is of sufficient size to be included within the confines of the recess 24 and engage the walls of such recess to prevent rotation of said rod. However, other types of head may be used if they are small enough to be fully included in the recess 24. In this case, the rod 13 is first inserted through the aperture 16 with its head 17 resting in the recess 24 and its shank extending laterally of the socket 11. The socket 11 is held in clamped position against the outside wall of the container 10 and is spot welded at its corners, as indicated at 18. The spot welding process fuses the metal of the socket with metal of the container without marring or deforming the smooth surface of the interior of the latter.

After the socket 11 is welded to the container, the spacer 12 is placed over the rod 13 and fitted over the projection 25 to prevent its turning. In the embodiment shown, the neck or spacer 12 is cut from extruded aluminum tubing of rectangular cross-sectional shape. The interior is of sufficient size to snugly fit over the projection 25. If the projection 25 takes another non-circular shape than rectangular, then the spacer 12 is shaped to mate with it in order to prevent any relative rotation occurring therebetween.

The non-metallic handle 14 is provided with a tenon 23 which is likewise shaped to conform with and fit within the interior of the spacer 12 to prevent the handle from rotating with respect to the spacer. The handle has therethrough a centrally positioned longitudinally extending opening 19 which fits over the rod 13. In order to hold the handle and spacer in place, the outer end of rod 13 is threaded, as indicated at 20, and terminates just within the outer end of the non-metallic handle when the latter is assembled in place. A threaded nut 15, provided with a projection 21 adapted to fit within the opening 19, is threaded on the rod 28 and presses against the outer end of the handle 14 to hold the handle and spacer rigidly assembled to the base plate 11. The handle 14 is provided at its inner upper end with a thumb-engaging mound 22 which prevents the hand of the user from sliding into contact with the metallic portions of the socket.

Although only one embodiment of the invention is shown and described herein, it will be understood that this application is intended to cover such changes or modifications as come within the spirit of the invention or scope of the following claims.

I claim:

1. A handle assembly adapted for attachment to a container made of sheet aluminum, comprising a base plate formed of sheet aluminum and having a flange, said base plate having a socket with a non-circular recess in its container confronting side, an opening through the base plate, a handle-holding member positioned in the opening and extending therefrom, said member being shaped at its inner end and cooperating with the walls of the recess to restrict rotational movement of the member whereby said base plate and member may be assembled and said flange spot-welded to said container before complete assembly, an aluminum spacer neck fitted over the member and engaging the socket, a non-metallic handle fitted over said member and having a seat engaging the neck, and threaded means engaging the member and the handle to hold the handle and neck tightly against said socket.

2. A handle assembly adapted for attachment to a container made of sheet aluminum, comprising, a base plate formed of sheet aluminum and having a flange shaped to fit flush against the side of said container, said base plate having a non-circular projection with a non-circular recess in its container confronting side, an opening through the base plate, a holding member positioned in the opening and extending therefrom, said member having an inner end within said recess cooperating with the walls thereof to restrict rotational movement of said member whereby said member may be positioned in said base plate prior to attachment of said assembly to permit said flange to be spot-welded to said container, an aluminum spacer neck fitted over and engaging said non-circular projection to prevent relative rotation therebetween, a non-metallic handle having a tenon fitted within said neck to prevent relative rotation between said handle and neck, and threaded means engaging said holding member and said handle to hold said handle and neck tightly against said non-circular projection.

RALPH N. KIRCHER.

REFERENCES CITED

The following references are of record in the file of this patent:

UNITED STATES PATENTS

| Number | Name | Date |
|---|---|---|
| 42,522 | Williams | Apr. 26, 1864 |
| 1,306,100 | Chadwick | June 10, 1919 |
| 1,403,232 | Collard | Jan. 10, 1922 |
| 1,549,195 | Greenberg | Aug. 11, 1925 |
| 1,606,833 | Grover | Nov. 16, 1926 |
| 1,788,817 | Wilson et al. | Jan. 13, 1931 |
| 1,809,060 | Nelson et al. | June 9, 1931 |
| 1,900,565 | Kircher | Mar. 7, 1933 |
| 2,172,524 | Stevens | Sept. 12, 1939 |

FOREIGN PATENTS

| Number | Country | Date |
|---|---|---|
| 525,830 | France | Sept. 28, 1921 |
| 730,340 | France | Aug. 11, 1932 |